United States Patent
Bergström

(10) Patent No.: US 9,179,480 B2
(45) Date of Patent: Nov. 3, 2015

(54) APPARATUS AND METHOD FOR DYNAMICALLY SELECTING A RANDOM ACCESS RESPONSE WINDOW VALUE FOR USE WITH RANDOM ACCESS PROCEDURES IN A NETWORK

(71) Applicant: Telefonaktiebolaget L M Ericsson (publ), Stockholm (SE)

(72) Inventor: Mattias Bergström, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 134 days.

(21) Appl. No.: 13/983,172

(22) PCT Filed: Jun. 24, 2013

(86) PCT No.: PCT/SE2013/050754
§ 371 (c)(1),
(2) Date: Aug. 1, 2013

(87) PCT Pub. No.: WO2014/017966
PCT Pub. Date: Jan. 30, 2014

(65) Prior Publication Data
US 2014/0334393 A1 Nov. 13, 2014

Related U.S. Application Data

(60) Provisional application No. 61/675,065, filed on Jul. 24, 2012.

(51) Int. Cl.
H04W 74/08 (2009.01)
H04W 74/00 (2009.01)

(52) U.S. Cl.
CPC ........ *H04W 74/0833* (2013.01); *H04W 74/002* (2013.01)

(58) Field of Classification Search
CPC ................. H04W 74/0833; H04W 74/002
USPC ................................................. 370/329
See application file for complete search history.

(56) References Cited

U.S. PATENT DOCUMENTS

| | | |
|---|---|---|
| 2009/0034452 A1 | 2/2009 | Somasundaram et al. |
| 2011/0014922 A1 | 1/2011 | Jen |
| 2011/0194478 A1 | 8/2011 | Lee et al. |
| 2011/0249641 A1* | 10/2011 | Kwon et al. ................. 370/329 |
| 2012/0076042 A1* | 3/2012 | Chun et al. ................. 370/252 |
| 2012/0300714 A1* | 11/2012 | Ng et al. ..................... 370/329 |
| 2012/0314652 A1* | 12/2012 | Ahn et al. .................. 370/328 |
| 2013/0003673 A1* | 1/2013 | Dinan ......................... 370/329 |
| 2013/0010716 A1* | 1/2013 | Dinan ......................... 370/329 |
| 2013/0046968 A1* | 2/2013 | Dinan ......................... 713/150 |

FOREIGN PATENT DOCUMENTS

| | | |
|---|---|---|
| EP | 2178321 A1 | 4/2010 |
| WO | 2011017281 A1 | 2/2011 |

OTHER PUBLICATIONS

Huawei et al., "3rd Generation Partnership Project: RA Reponse Window for sTAG (R2-122316)", 3rd Generation Partnership Project (3GPP TSG-RAN WG2 Meeting #78), Agenda Item: 7.1.2.1, May 21-25, 2012, 2 pages, Prague, Czech Republic.
Chairman, "3rd Generation Partnership Project: Chairman Notes (R2-12xxxx)", 3rd Generation Partnership Project (3GPP TSG RAN WG2 #78), May 21-25, 2012, 89 pages, Prague, Czech Republic.
International Search Report for International Patent Application No. PCT/SE2013/050754, mailed Nov. 20, 2013, 16 pages.
Invitation to Pay Fees for International Patent Application No. PCT/SE2013/050754, mailed Sep. 30, 2013, 7 pages.
International Preliminary Report on Patentability for International Patent Application No. PCT/SE2013/050754, mailed Jan. 27, 2015, 10 pages.

\* cited by examiner

*Primary Examiner* — Brian D Nguyen
(74) *Attorney, Agent, or Firm* — Patent Portfolio Builders, PLLC

(57) ABSTRACT

A method is provided in a user equipment node for dynamically selecting a random access response window value for use with random access procedures in a network. The method comprises the step of determining if a random access response window value is being signalled from the network for a first serving cell currently associated with the user equipment node. If so, the random access response window value being signalled for the first serving cell is used when performing a random access procedure in the first serving cell. If not, an alternative random access response window value for the first serving cell is used when performing a random access procedure in the first serving cell.

50 Claims, 12 Drawing Sheets

APPARATUS AND METHOD FOR DYNAMICALLY SELECTING A RANDOM ACCESS RESPONSE WINDOW VALUE FOR USE WITH RANDOM ACCESS PROCEDURES IN A NETWORK

This application is a 35 U.S.C. §371 national phase filing of International Application No. PCT/SE2013/050754, filed Jun. 24, 2013, the disclosure of which is incorporated herein by reference in its entirety.

TECHNICAL FIELD

The present invention relates to an apparatus and method for dynamically selecting a random access response window value for use with random access procedures in a network.

BACKGROUND

Current handling of the random access response window imposes unnecessary restrictions on the network and user equipment nodes (UEs).

Long Term Evolution (LTE) uses Orthogonal Frequency Division Multiplexing (OFDM) in a downlink and Discrete Fourier Transform (DFT) spread OFDM in the uplink. The basic LTE downlink physical resource can thus be seen as a time-frequency grid 101 as illustrated in FIG. 1, where each resource element 103 corresponds to one OFDM subcarrier during one OFDM symbol interval.

Referring to FIG. 2, in the time domain, LTE downlink transmissions are organized into radio frames 201 of 10 ms, each radio frame consisting of ten equally-sized subframes $203_0$ to $203_9$, each of length $T_{subframe}=1$ ms.

Furthermore, the resource allocation in LTE is typically described in terms of resource blocks (RB), where a resource block corresponds to one slot (0.5 ms) in the time domain and 12 contiguous subcarriers in the frequency domain. A pair of two adjacent resource blocks in the time direction (1.0 ms) is known as a resource block pair. Resource blocks are numbered in the frequency domain, starting with "0" from one end of the system bandwidth.

The notion of virtual resource blocks (VRB) and physical resource blocks (PRB) has been introduced in LTE. The actual resource, allocation to a UE is made in terms of VRB pairs. There are two types of resource allocations, localized and distributed. In the localized resource allocation, a VRB pair is directly mapped to a PRB pair, hence two consecutive and localized VRB are also placed as consecutive PRBs in the frequency domain. On the other hand, the distributed VRBs are not mapped to consecutive PRBs in the frequency domain; thereby providing frequency diversity for data channel transmitted using these distributed VRBs.

Downlink transmissions are dynamically scheduled. That is, in each subframe the base station transmits control information relating to which terminals data is transmitted and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols (CRS), which are known to the receiver and used for coherent demodulation of e.g. the control information. A downlink system with CFI=3 OFDM symbols as control is illustrated in FIG. 3.

The release 10 of the LTE specifications (LTE Rel-10) have been standardized, supporting Component Carrier (CC) bandwidths up to 20 MHz (which is the maximal LTE Rel-8 carrier bandwidth). An LTE Rel-10 operation wider than 20 MHz is possible and appears as a number of LTE CCs to an LTE Rel-10 terminal. One way to obtain bandwidths wider than 20 MHz is by means of Carrier Aggregation (CA). CA implies that an LTE Rel-10 terminal can receive multiple CC, where the CC have, or at least the possibility to have, the same structure as a Rel-8 carrier. CA is illustrated in FIG. 4, whereby five 20 MHz CCs $401_1$ to $401_5$ are shown as being aggregated to provide a bandwidth of 100 MHz.

The Rel-10 standard of LTE support up to 5 aggregated CCs where each CC is limited in the RF specifications to have a one of six bandwidths namely 6, 15, 25, 50, 75 or 100 RB (corresponding to 1.4, 3 5 10 15 and 20 MHz respectively).

The number of aggregated CCs as well as the bandwidth of the individual CCs may be different for uplink and downlink. A symmetric configuration refers to the case where the number of CCs in downlink (DL) and uplink (UL) is the same whereas an asymmetric configuration refers to the case that the number of CCs is different in downlink and uplink. The number of CCs configured in the network may be different from the number of CCs seen by a terminal: A terminal may, for example, support more downlink CCs than uplink CCs, even though the network offers the same number of uplink and downlink CCs.

CCs are also referred to as cells or serving cells. More specifically, in an LTE network the cells aggregated by a terminal are denoted primary Serving Cell (PCell) and secondary Serving Cells (SCells). The term serving cell comprises both PCell and SCell. All UEs have one PCell and which cell is a UEs PCell is terminal specific and is considered "more important", i.e. vital control signaling and other important signaling is typically handled via the PCell. Uplink control signaling is sent on a UEs PCell. The component carrier configured as the PCell is the primary CC whereas all other component carriers are secondary serving cells.

During initial access a LTE Rel-10 terminal behaves similar to a LTE Rel-8 terminal. However, upon successful connection to the network a Rel-10 terminal may—depending on its own capabilities and the network—be configured with additional serving cells in the uplink and downlink. Configuration is based on radio resource control (RRC). Due to the heavy signaling and rather slow speed of RRC signaling it is envisioned that a terminal may be configured with multiple serving cells even though not all of them are currently used.

Random Access

In LTE, as in any communication system, a mobile terminal may need to contact the network (via the eNodeB) without having a dedicated resource in the Uplink (from UE to base station). To handle this, a random access procedure is available where a UE that does not have a dedicated uplink resource may transmit a signal to the base station. The first message (MSG1 or preamble) of this procedure is typically transmitted on a special uplink resource 501 reserved for random access, a physical random access channel (PRACH), with other uplink resources 503 being used for data transmission. This channel can for instance be limited in time and/or frequency (as in LTE), as shown in FIG. 5.

The resources available for PRACH transmission is provided to the terminals as part of the broadcasted system information (or as part of dedicated RRC signaling in case of handover, for example).

In LTE, the random access procedure can be used for a number of different reasons. Among these reasons are:
 Initial access (for UEs in the LTE_IDLE or LTE_DE-TACHED states)
 Incoming handover
 Resynchronization of the UL Scheduling request (for a UE that is not allocated any other resource for contacting the base station)

Positioning

A contention-based random access (CBRA) procedure used in LTE is illustrated in FIG. 6. The UE starts the random access procedure by randomly selecting one of the preambles available for contention-based random access. The UE then transmits the selected Random Access Preamble message 601 on the physical random access channel (PRACH) to a network node such as an eNode B in the network.

The network acknowledges any preamble it detects by transmitting a Random Access Response message 603 (MSG2) including an initial grant to be used on the uplink shared channel, a temporary Cell-Radio Network Temporary Identifier (C-RNTI), and a time alignment (TA) update based on the timing offset of the preamble measured by the eNodeB on the PRACH. The Random Access Response message 603 (MSG2) is transmitted in the downlink to the UE and its corresponding Physical Downlink Control Channel (PDCCH) message's Cyclic Redundancy Check (CRC) is scrambled with the Random Access-Radio Network Temporary Identifier (RA-RNTI).

When receiving the Random Access Response message 603 (MSG2) the UE uses the grant to transmit a Scheduled Transmission message 605 (MSG3) that in part is used to trigger the establishment of radio resource control and in part to uniquely identify the UE on the common channels of the cell. The timing advance command provided in the Random Access Response message 603 is applied in the UL transmission in the Scheduled Transmission message 605 (MSG3). The eNodeB can change the resources blocks that are assigned for a Scheduled Transmission message 605 (MSG3) by sending an uplink grant, the CRC of which is scrambled with the Temporary Cell-Radio Network Temporary Identifier (TC-RNTI).

The Contention Resolution message 607 (MSG4) then has its PDCCH CRC scrambled with the C-RNTI if the UE previously has a C-RNTI assigned. If the UE does not have a C-RNTI previously assigned, it has its PDCCH CRC scrambled with the TC-RNTI.

The procedure ends with the network solving any preamble contention that may have occurred for the case that multiple UEs transmitted the same preamble at the same time. This can occur since each UE randomly selects when to transmit and which preamble to use. If multiple UEs select the same preamble for the transmission on RACH, there will be contention between these UEs that needs to be resolved through the Contention Resolution message 607 (MSG4). The case when contention occurs is illustrated in FIG. 7, where two UEs $701_1$ and $701_2$ transmit the same preamble, $p_5$, at the same time. A third UE $701_3$ also transmits at the same RACH, but since it transmits with a different preamble, $p_1$, there is no contention between this UE $701_3$ and the other two UEs $701_1$ and $701_2$.

It is noted that a UE can also perform non-contention based random access. A non-contention based random access or contention free random access (CFRA) can, for example, be initiated by the eNodeB to get the UE to achieve synchronisation in the uplink. The eNodeB initiates a contention free random access either by sending a PDCCH order or indicating it in an RRC message. The later of the two is used in case of handover.

The eNodeB can also order the UE through a PDCCH message to perform a contention based random access; the procedure for this being illustrated in FIG. 8. The eNodeB transmits a Random Access Order message 801 to a UE, and a UE will transmit a Random Access Preamble message 803 to the eNodeB. Similar to the contention based random access described in FIG. 6, a Random Access Response message 805 (MSG2) is transmitted in the downlink to the UE and its corresponding PDCCH message CRC is scrambled with the RA-RNTI. The UE considers the contention resolution successfully completed after it has received the Random Access Response message 805 (MSG2) successfully.

For the contention free random access, in a similar manner to the contention based random access, the Random Access Response message 805 (MSG2) contains a timing alignment value. This enables the eNodeB to set the initial/updated timing according to the UEs transmitted preamble.

In LTE in Rel-10 the random access procedure is limited to the primary cell only. This implies that the UE can only send a preamble on the primary cell. Further a Random Access Response message 603 (MSG2) and a Scheduled Transmission message 605 (MSG3) is only received and transmitted on the primary cell. A Contention Resolution message 607 (MSG4) can, however, in Rel-10 be transmitted on any downlink cell.

In LTE Rel-11 random access procedures will be supported also on secondary cells, at least for the UEs supporting Rel-11 carrier aggregation. So far only network initiated random access on SCells is assumed.

Random Access Response Window

After a UE has sent a preamble it listens for a random access response from the network for a certain time, this time period given by the value of a random access response window. After a time equal to the random access response window has passed the UE considers the preamble transmission to be unsuccessful and resends the preamble. Each time the UE resends the preamble the UE will increase the output power used to transmit the preamble to increase the chance of a successful preamble transmission. The UE will transmit a maximum number of preambles given by a value "preamble transmission maximum".

In LTE Rel-10 with the introduction of carrier aggregation the UE is able to aggregate multiple carriers, i.e. to be configured with a PCell and SCells. For LTE Rel-11 a UE is able to perform random access procedures on SCells. In contrary to the PCell, however, there is no way of signaling the parameters necessary for performing a random access procedure on SCells. In particular, the RA response window value is currently discussed in 3GPP whether it shall be signaled for SCells or not. If it is signaled for SCells the UE would use the RA response window value for the SCell where the RA procedure is performed while if the RA response window is not signaled for SCells the UE would apply the RA response window value for the PCell when performing RA on SCells. If the UE applies a cell specific RA response window the network implementation might become more complex than the case if a UE always applies the RA response window of the PCell also for RA procedures performed on SCells. However, having cell specific RA response windows will increase flexibility. One network vendor, vendor A, might prefer to avoid this extra complexity and hence prefer to not signal RA response window values for SCells. Another network vendor, vendor B, might judge that the extra complexity is justified to obtain the added flexibility it would mean to have RA response window values for SCells. If the LTE specification is specified so that different cells are configured with different SCell RA response windows, vendor A is forced to specify RA response windows for different SCells. If the LTE specification is specified so that the UE applies the PCells RA response window also for SCell RA procedures, vendor B will not have the flexibility it wants. A disadvantage of this is that both vendor A and vendor B's needs cannot be met with current solutions.

As described above two types of RA procedures are defined; contention based random access (CBRA) and non-contention based random access or contention free random access (CFRA). These two types of RA procedures are used for different purposes and in different situations. For example CBRA is used by UEs when performing initial access to the network while CFRA is used when a UE is achieving uplink time alignment on SCells in a secondary TA group. With current solutions the UE applies the same RA response window for these two types of RA which puts unnecessary restrictions on the network and UE.

SUMMARY

It is an aim of the present invention to provide a method and apparatus which obviate or reduce at least one or more of the disadvantages mentioned above.

According to one embodiment there is provided a method in a user equipment node for dynamically selecting a random access response window value for use with random access procedures in a network. The method comprises the step of determining if a random access response window value is being signalled from the network for a first serving cell currently associated with the user equipment node. If so, the random access response window value being signalled for the first serving cell is used when performing a random access procedure in the first serving cell. If not, an alternative random access response window value for the first serving cell is used when performing a random access procedure in the first serving cell.

According to another embodiment, there is provided a user equipment node adapted to dynamically select a random access response window value for use with random access procedures in a network. The user equipment node comprises a monitoring unit adapted to determine if a random access response window value is being signalled from the network for a first serving cell currently associated with the user equipment node. A processing unit is adapted to use the random access response window value, if one is being signalled for the first serving cell, when performing a random access procedure in the first serving cell. The processing unit is further adapted to use an alternative random access response window value when a random access response window value is not being signalled for the first serving cell, when performing a random access procedure in the first serving cell.

According to another embodiment, there is provided a method in a network node for controlling how a user equipment node dynamically selects a random access response window value for use with random access procedures in the network. The method comprises the steps of transmitting a control signal to the user equipment node in a first serving cell, wherein the control signal comprises control information for enabling the user equipment node to select a second serving cell whose random access response window value is to be used as an alternative random access response window value, when performing random access procedures in a first serving cell.

According to another embodiment, there is provided a network node for controlling how a user equipment node dynamically selects a random access response window value for use with random access procedures in a network. The network node comprises a transmitting unit adapted to transmit a control signal to the user equipment node in a first serving cell, wherein the control signal comprises control information for enabling the user equipment node to select a second serving cell whose random access response window value is to be used as an alternative random access response window value, when performing random access procedures in a first serving cell.

According to another embodiment, there is provided a method in a user equipment node for dynamically selecting a random access response window value for use with random access procedures in a network. The method comprises the steps of maintaining a first random access response window value relating to a contention based random access, CBRA, procedure, and maintaining a second random access response window value relating to a contention free random access, CFRA, procedure. The first or second random access response window value is dynamically selected when performing a random access procedure in a current serving cell; according to whether a CBRA or CFRA procedure is being performed.

According to another embodiment, there is provided a user equipment node for dynamically selecting a random access response window value for use with random access procedures in a network. The user equipment node comprises a storage unit adapted to store a first random access response window value relating to a contention based random access, CBRA, procedure, and a second random access response window value relating to a contention free random access, CFRA, procedure. A processing unit is adapted to dynamically select the first or second random access response window value when performing a random access procedure in a current serving cell, according to whether a CBRA or CFRA procedure is being performed.

According to another embodiment, there is provided a method in a network node for controlling how a user equipment node dynamically selects a random access response window value for use with random access procedures in the network. The method comprises the steps of: during a first mode of operation, signalling both CBRA and CFRA response window values to a user equipment node; during a second mode of operation, signalling only one of CBRA or CFRA response window values to a user equipment node; and during a third mode of operation, signalling neither of the CBRA or CFRA response window values to the user equipment, and instead signalling a default random access response window value; wherein the method comprises the steps of switching between at least two of the first, second or third modes of operation.

According to another embodiment, there is provided a network node for controlling how a user equipment node dynamically selects a random access response window value for use with random access procedures in the network. The network node comprises a processing unit adapted such that: during a first mode of operation, both CBRA and CFRA response window values are signalled to a user equipment node; during a second mode of operation, only one of CBRA or CFRA response window values are signalled to a user equipment node; and during a third mode of operation, neither of the CBRA or CFRA response window values are signalled to the user equipment, and instead a default random access response window value is signalled; wherein the processing unit is further adapted to switch between at least two of the first, second or third modes of operation.

BRIEF DESCRIPTION OF THE DRAWINGS

For a better understanding of the present invention, and to show more clearly how it may be carried into effect, reference will now be made, by way of example only, to the following drawings in which.

DETAILED DESCRIPTION

Figure 1:
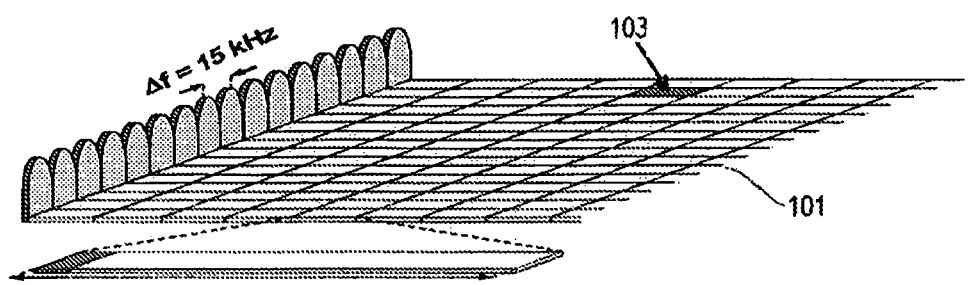
FIG. 1 shows a downlink physical resource of a Long Term Evolution (LTE) network.
Figure 2:
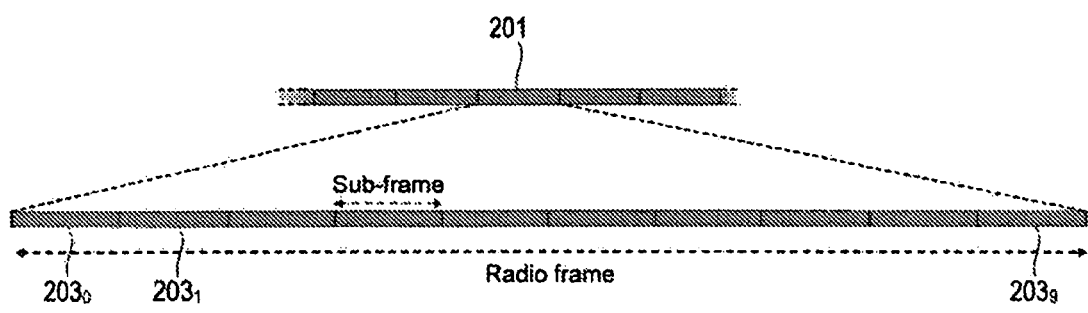
FIG. 2 shows a LTE time-domain structure.
Figure 3:
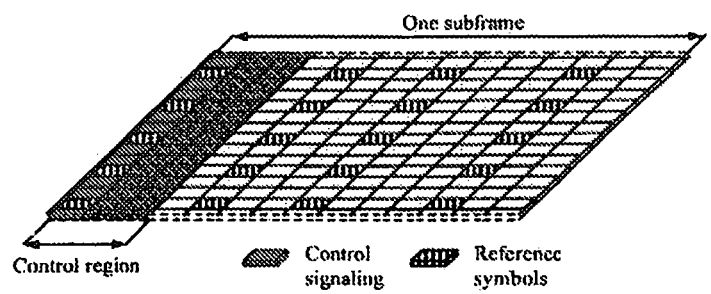
FIG. 3 shows a downlink system with a control format indicator (CFI) equal to three OFDM symbols as control.
Figure 4:
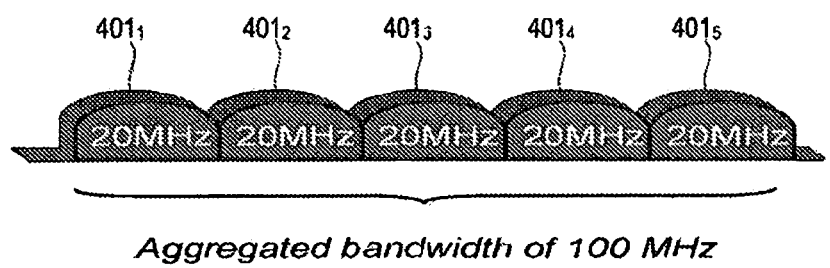
FIG. 4 shows an example of carrier aggregation.
Figure 5:
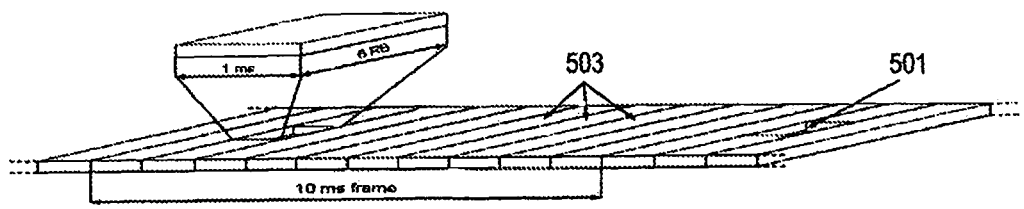
FIG. 5 shows an illustration of a random-access-preamble transmission.
Figure 6:
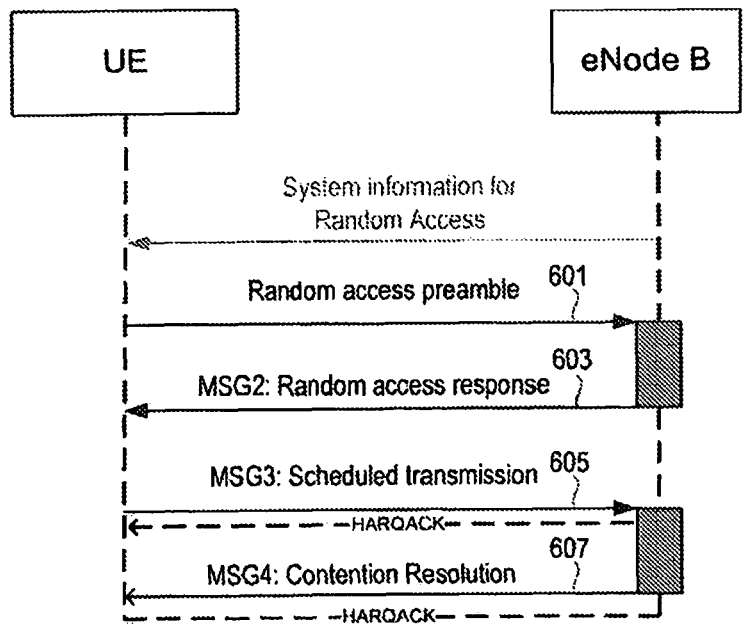
FIG. 6 illustrates the contention-based random access (CBRA) procedure used in LTE.
Figure 7:
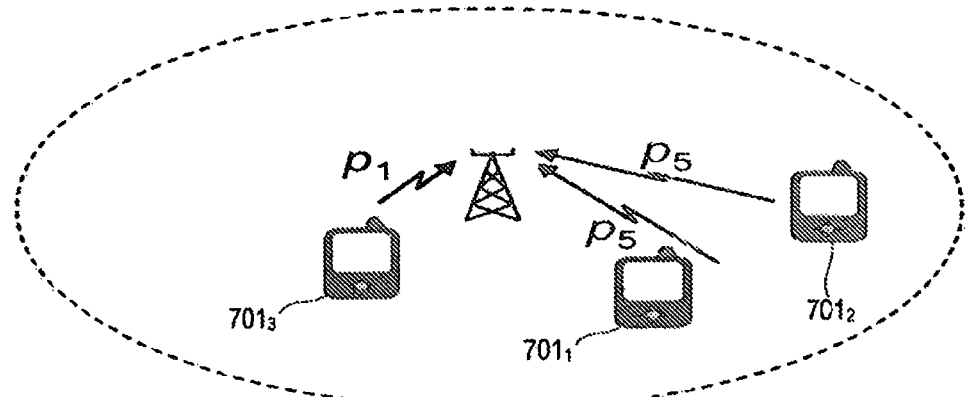
FIG. 7 shows an illustration of contention based random access, where there is contention between two UEs.
Figure 8:
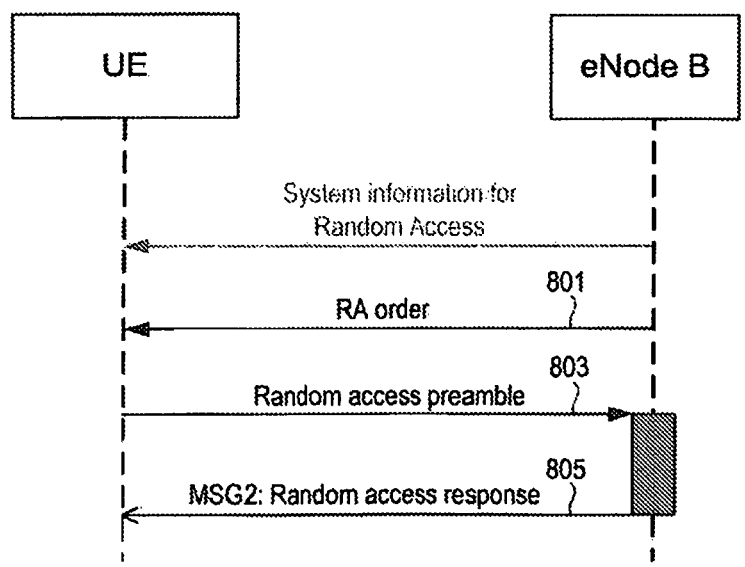
FIG. 8 illustrates a procedure for a UE to perform contention-free random access, and shows the signaling over the air interface for the contention-free random access procedure in LTE.

In a first set of embodiments the specification is designed so that it is supported to signal RA response windows per SCell at the same time as it is supported to only signal a RA response window for the PCell. With this design it is supported to have a simple implementation which only signals a RA response window value for the PCell and supported to have a more advanced implementation which signals RA response window values also for SCells.

In a second set of embodiments methods and apparatus are explained which allows the UE to use different RA response window values when performing contention based random access (CBRA) procedures and contention free random access (CFRA) procedures.

Methods and apparatus are described for using different RA response window values in an efficient and flexible way. The first section describes methods and apparatus which both allows for simple network implementations where RA response windows are only signaled to the UEs PCell and allows for more advanced network implementation where the network signals different RA response windows on different cells. The second section describes methods which allow the UE to use different RA response windows when performing CBRA and CFRA.

Example flowcharts are found in FIGS. 13 and 16, which will be described in greater detail below.

In a first embodiment the UE applies an alternative random access (RA) response window for a RA procedure on a serving cell for which a RA response window does not exist. For example, when the UE is performing a RA procedure on a serving cell X for which there is no defined RA response window the UE applies an alternative RA response window.

In a second embodiment the alternative RA response window described in the first embodiment is a RA response window of another serving cell, rather than the serving cell which is performing the RA procedure. Following the example in the first embodiment the UE would for the serving cell X apply a RA response window for another cell Y.

According to a third embodiment the alternative serving cell whose RA response window should be used according to the second embodiment is selected based on predefined rules. An example of predefined rules are that a cell for which the RA response window does not exist will use the RA response window of the 1) a primary cell PCell associated with the user equipment node, 2) another secondary cell SCell with the lowest (or highest) cell index, 3) another secondary cell having the highest or lowest secondary cell index, 4) a serving cell within the same timing advance (TA) group which has the lowest (or highest) cell index, 5) a serving cell within the same timing advance (TA) group which has the lowest (or highest) secondary cell index, 6) a serving cell with the lowest (or highest) carrier frequency, or 7) a serving cell within the same timing advance (TA) group which has the highest or lowest carrier frequency. According to one embodiment the rules are performed in the above order, but it is noted that the order of the rules may be changed for other embodiments.

According to a fourth embodiment the alternative serving cell whose RA response window should be used according to the second embodiment is signaled by the network. In one alternative of this embodiment the network signals an alternative serving cell which shall be used by all serving cells which has yet no RA response window value assigned to them. In another alternative of this embodiment the network signals per serving cell an alternative serving cell whose RA response window shall be used in case the serving cell has no RA response window.

In a fifth embodiment the alternative RA response window described in the first embodiment is a default RA response window. Examples of default RA response window selection mechanisms include:

1) the default RA response window is predefined. The benefit of having a predefined default RA response window is that signaling can be saved.

2) the default RA response window is signaled to the UE by the network. The benefit of allowing the network to set the default RA response window is that it gives the network flexibility in scenarios where it finds it necessary.

3) a combination of a predefined and network signaled default RA response window is used. The UE would use the predefined RA response window unless it has received a RA response window signaled by the network: The network has the possibility to let the UE use the predefined RA response window if it deems it to be suitable, but in case the network wants to adjust it the network has the possibility to do so.

In a sixth embodiment of this invention the UE will use one value for the RA response window when performing a contention based random access (CBRA) procedure and another value when performing a contention free random access (CFRA) procedure.

CBRA and CFRA are performed on different cells for different reasons. For example, according to current LTE Rel-11 specification, CFRA is performed on an SCell in an SCell-only TA group in order to get the SCells in the TA group in-synch. However, a CBRA procedure is performed on the PCell in order for the UE to get initial access to the network.

These examples for performing RA can be considered to be of different importance and if there are different RA response windows defined for CBRA and CFRA procedures the network has the opportunity to prioritize these RA procedures differently. If, for example, the network gives the CFRA procedure a larger RA response value than the CBRA procedure the network can treat the CFRA procedure later than the CBRA procedures by scheduling the RA responses for the CFRA procedures later than the RA responses for the CBRA procedures.

In a seventh embodiment a UE, which is capable of maintaining one RA response window for CBRA and one for CFRA would, if it receives a message containing a RA response window which is not directed to only one type of RA (CBRA or CFRA), apply the received value both when performing CBRA and CFRA procedures. According to current specification the network does not distinguish between CBRA and CFRA when signaling the RA response window. A benefit of this embodiment is that a UE which is capable of maintaining one RA response window value for CBRA and one for CFRA will behave as a non-capable UE when served by a network node which, as for example according to current specification, does not distinguish between CBRA and CFRA when signaling the RA response window. This will allow for simpler network implementation.

In an eighth embodiment a UE, which is capable of maintaining one RA response window for CBRA and one for CFRA would, if it receives a message containing a RA response window which is directed to CBRA (or CFRA) and this UE has not yet received a RA response window value for CFRA (CBRA) would apply the received value also for CFRA (CBRA). Thus, if the network only signals a value for CBRA (or CFRA) and has not signaled a value for CFRA (CBRA) the UE would apply the signaled value also for CFRA (CBRA). If at a later stage the network may signal a value for CFRA (CBRA) the UE can then set the CFRA (CBRA) RA response window value according to the signaled value. The network has the possibility to signal different values for CBRA and CFRA only at times it finds suitable, while when it is not necessary it can signal only one of these values.

It is noted that combinations of any one or more of the embodiments described above and below can be made. For example, if it has been signaled to a UE a RA response window value which should be used for CBRA on cell X and another value which should be used for CFRA on a cell X while it has only been signaled a RA response window value which shall be used for CFRA on cell Y but no value has been signaled for CBRA on cell Y, a combination of the second and eighth embodiment would mean that said UE would apply the CBRA value of another cell when performing CBRA on cell Y, e.g. the CBRA value cell X.

It is noted that the embodiments of the invention (both in the first and second aspect, i.e. embodiments 1-5 and 6-8 respectively) enable a network to have the optionality to signal random access response windows, RARWs, (in the first aspect, to the whole cell, and in the second aspect, for CFRA/CBRA). This may be realized by having an optionality-flag for a RARW-field in the message carrying the RARW-field (currently it is proposed that RARWs are carried by the RACH-configuration information element in RRC signaling). Such an optionality-flag (or bit or bits) may be inspected by a UE when it determines if a RARW value has been signalled. A network can set (or not set) this optionality-flag when it signals (or not signals) a certain RARW.

For the first aspect of the invention, the network can set the optionality-flag when sending a RARW for a specific cell and a UE would, if seeing that the flag is set in the RACH-configuration information element, assume that there is a RARW present and then apply the RARW for this cell.

For the second aspect of the invention, the network can set the optionality-flag when sending the information element carrying the proposed CBRA (or CFRA) RARW and the UE would then inspect this optionality-flag when determining if the network has signalled a CBRA RARW (or CFRA RARW).

As mentioned above, the optionality-flag can be sent with the RRC. However, it is noted that the embodiments are intended to cover the optionality-flag being sent or communicated in other ways.

With the first set of embodiments above, referred to as embodiments one to five, a degree of freedom is added to network implementation. Methods have been presented which describe how the UE shall select a random access response window for serving cells which does not have a random access response window assigned. A simple network implementation design may not signal different RA response window values for different serving cells of a UE, while a more advanced network implementation design may signal different RA response window values to the UE and hence get more flexibility. With the embodiments presented herein both these design choices will be supported.

With the second set of embodiments, referred to as the sixth to eight embodiments above, a UE will apply different RA response window values when performing a CBRA compared to a CFRA. This has the advantage of increasing the network flexibility and random access performance which will ultimately improve user experience and system performance. The embodiments also present ways that ensure that a simple network implementation design which does not signal different RA response window values for CBRA and CFRA will work as well as a design which does signal different values for CBRA and CFRA.

Figure 9:
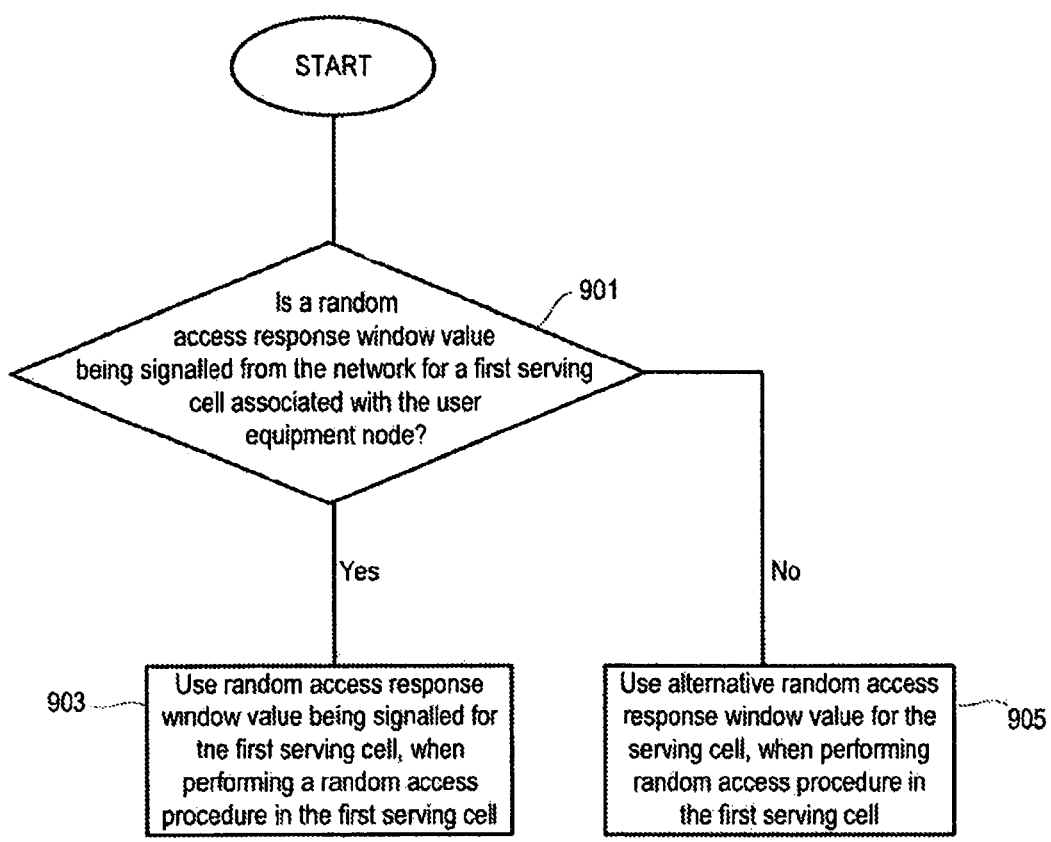
FIG. 9 shows a method in a user equipment node according to an embodiment.

FIG. 9 shows a method in a user equipment node for dynamically selecting a random access response window value for use with random access procedures in a network, according to one embodiment. The method comprises the step of determining if a random access response window value is being signalled from the network for a first serving cell currently associated with the user equipment node, step 901. If so, the random access response window value being signalled for the first serving cell is used when performing a random access procedure in the first serving cell, step 903. If not, an alternative random access response window value for the first serving cell is used when performing a random access procedure in the first serving cell, step 905.

By having a choice between using a signalled value or an alternative value, this has the advantage of enabling the user equipment to work with vendors who choose to signal a RA response window value per cell, and also with vendors who choose not to.

According to one example the alternative random access response window value is a random access response window value associated with a second serving cell.

Predefined rules may be used for selecting the second serving cell whose random access response window value is to be used.

Having a set of predefined rules has the advantage of enabling different values to be selected in a particular order, which can be changed for different applications.

When the first serving cell is a secondary cell, the step of selecting the second serving cell according to predefined rules may comprise the steps of selecting one or more of the following cells in a particular order: a primary cell associated with the user equipment node; another secondary cell having the lowest or highest cell index; another secondary cell having the lowest or highest secondary cell index; a serving cell within the same timing advance group which has the lowest or highest cell index; a serving cell within the same timing advance group which has the lowest or highest secondary cell index; a serving cell with the lowest or highest carrier frequency; or a serving cell within the same timing advance group which has the highest or lowest carrier frequency.

According to one example a control signal is received from the network, with the control signal being used to select the second serving cell whose random access response window value is to be used as the alternative random access response window value.

The control signal received from the network can be generic to the first serving cell and its associated second serving cell, and any other first serving cell that does not have a random access response window value assigned thereto.

Alternatively, the control signal received from the network can be specific to the first serving cell.

According to one example the alternative random access response window value is a default random access response window value.

The default value of the alternative random access response window value can be selected from one of the following: a predefined random access response window value stored in the user equipment; a default random access response window value signalled to the user equipment from the network; or a combination of a predefined and network signalled default random access response window value.

The step of using a combination of predefined and network signalled default value may comprise the steps of using the predefined random access response window value stored in the user equipment node, unless the user equipment node receives an overriding random access response window value signalled from the network.

The step of determining if a random access response window value is being signalled from the network may comprise the step of monitoring an optionality-flag received from the network.

According to one example the optionality flag is received in a radio resource control, RRC, message.

Figure 10:
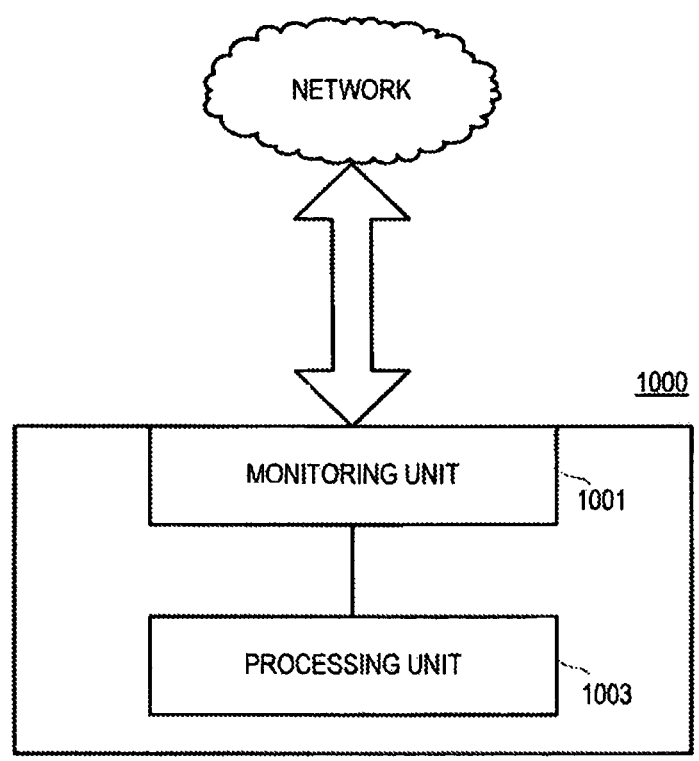
FIG. 10 shows a user equipment node according to another embodiment.

FIG. 10 shows a user equipment node according to one embodiment, the user equipment node 1000 being adapted to dynamically select a random access response window value for use with random access procedures in a network. The user equipment node comprises a monitoring unit 1001 adapted to determine if a random access response window value is being signalled from the network for a first serving cell currently associated with the user equipment node. A processing unit 1003 is adapted to use the random access response window value, if one is being signalled for the first serving cell, when performing a random access procedure in the first serving cell. The processing unit 1003 is further adapted to use an alternative random access response window value when a random access response window value is not being signalled for the first serving cell, when performing a random access procedure in the first serving cell.

By having a choice between using a signalled value or an alternative value, this has the advantage of enabling the user equipment to work with vendors who choose to signal a RA response window value per cell, and also with vendors who choose not to.

The alternative random access response window value can be a random access response window value associated with a second serving cell.

According to one embodiment, the processing unit 1003 is further adapted to use predefined rules for selecting the second serving cell whose random access response window value is to be used.

By having a set of rules, this enables different values to be selected in a particular order, which can be changed for different applications.

According to one example in which the first serving cell is a secondary cell, the processing unit 1003 is adapted when selecting the second serving cell according to predefined rules, to select one or more of the following cells in a particular order: a primary cell associated with the user equipment node; another secondary cell having the lowest or highest cell index; another secondary cell having the lowest or highest secondary cell index; a serving cell within the same timing advance group which has the lowest or highest cell index; a serving cell within the same timing advance group which has the lowest or highest secondary cell index; a serving cell with the lowest or highest carrier frequency; or a serving cell within the same timing advance group which has the highest or lowest carrier frequency.

The processing unit 1003 can be adapted to: receive a control signal from the network, and use the control signal to select the second serving cell whose random access response window value is to be used as the alternative random access response window value.

According to one example the control signal received from the network is generic to the first serving cell and its associated second serving cell, and any other first serving cell that does not have a random access response window value assigned to it.

Alternatively, the control signal received from the network can be specific to the first serving cell.

The random access response window value can be a default random access response window value.

According to one embodiment the processing unit 1003 is adapted to select the default value of the alternative random access response window from one of the following: a predefined random access response window value stored in the user equipment; a default random access response window value signalled to the user equipment from the network; or a combination of a predefined and network signalled default random access response window value.

The processing unit 1003 can be adapted, when using a combination of predefined and network signalled default values, to use the predefined random access response window value stored in the user equipment node, unless the user equipment node has received an overriding random access response window value signalled from the network.

The monitoring unit, when determining if a random access response window value is being signalled from the network, can be adapted to monitor an optionality-flag received from the network.

According to one example, the monitoring unit is adapted to monitor a radio resource control, RRC, message for the optionality-flag.

Figure 11:
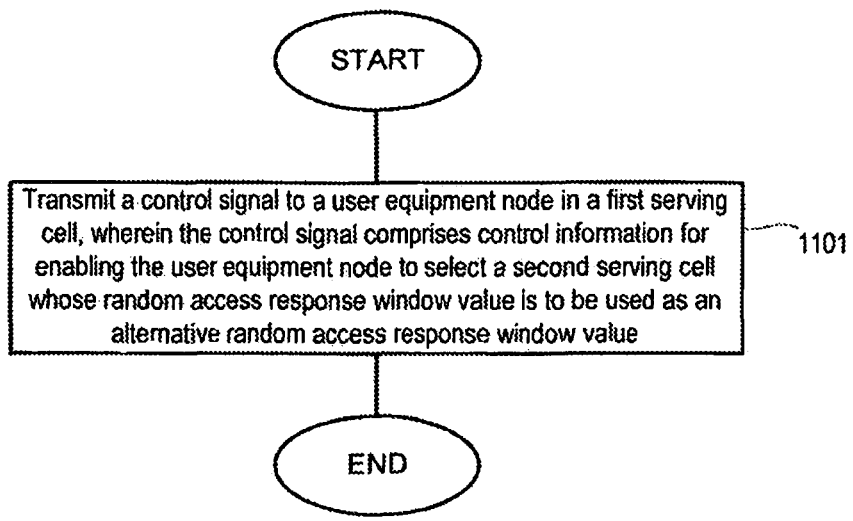
FIG. 11 shows a method in a network node according to another embodiment.

FIG. 11 shows a method in a network node for controlling how a user equipment node dynamically selects a random access response window value for use with random access procedures in the network, according to another embodiment. The method comprising the steps of transmitting a control signal to the user equipment node in a first serving cell, wherein the control signal comprises control information for enabling the user equipment node to select a second serving cell whose random access response window value is to be used as an alternative random access response window value, when performing random access procedures in a first serving cell, step 1101.

The transmitted control signal can be generic to the first serving cell and its associated second serving cell, and any other first serving cell that requires an alternative random access response window value.

Alternatively, the transmitted control signal can be specific to a first serving cell.

The step of transmitting a control signal may further comprise the step of transmitting an optionality-flag, and setting the optionality-flag when transmitting a random access response window for a specific cell.

According to one example, the optionality-flag can be transmitted in a radio resource control, RRC, message.

The step of transmitting a control signal to a user equipment node may comprise the step of selectively sending the control signal, according to whether or not the network node considers that the user equipment node is able to obtain an alternative random access response window.

Figure 12:
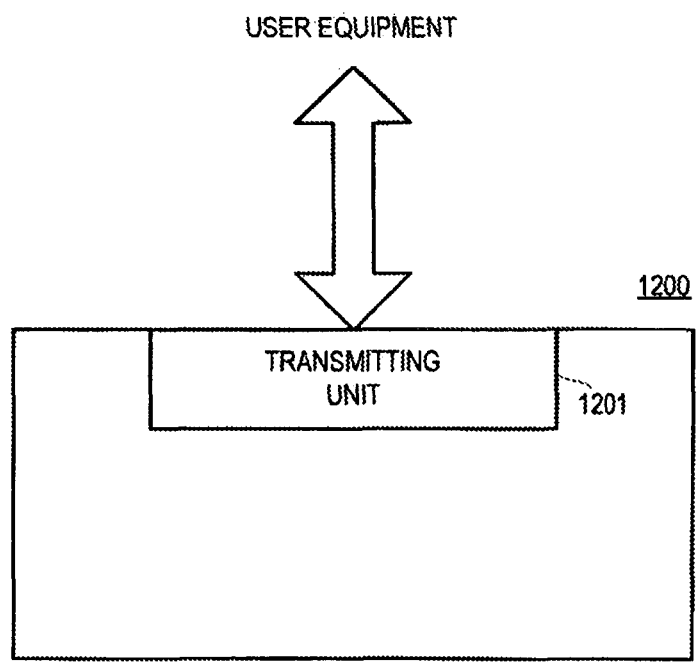
FIG. 12 shows a network node according to another embodiment.

FIG. 12 shows a network node 1200 for controlling how a user equipment node dynamically selects a random access response window value for use with random access procedures in a network, according to another embodiment. The network node comprises a transmitting unit 1201 adapted to transmit a control signal to the user equipment node in a first serving cell, wherein the control signal comprises control information for enabling the user equipment node to select a second serving cell whose random access response window value is to be used as an alternative random access response window value, when performing random access procedures in a first serving cell.

The transmitting unit can be adapted to transmit a control signal that is generic to the first serving cell and its associated second serving cell, and any other first serving cell that requires an alternative random access response window value.

Alternatively, the transmitting unit can be adapted to transmit a control signal that is specific to a first serving cell.

The transmitting unit can be further adapted to transmit an optionality-flag, the optionality-flag indicating whether or not a random access response window is being signalled.

According to one example, the optionality-flag is transmitted in a radio resource control, RRC, message.

The transmitting unit may be further adapted to selectively send the control signal, according to whether or not the network node considers that the user equipment node is able to obtain an alternative random access response window.

Figure 13:
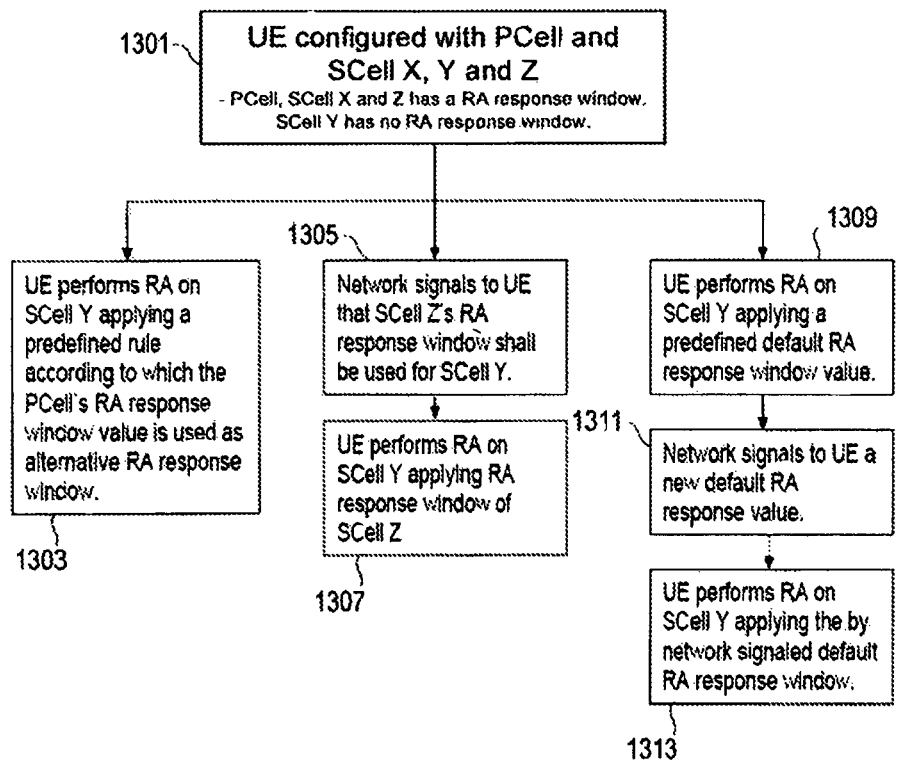
FIG. 13 shows a method in a user equipment node according to another embodiment.

FIG. 13 shows the method steps performed in a user equipment node, when adapted to perform the steps discussed above in the first set of embodiments relating to the first to fifth embodiments. Step 1301 shows a UE configured with a primary cell (PCell) and secondary cells (SCells) X, Y and Z. In the example the PCell and SCells X and Z have a RA response window, and the SCell Y has no RA response window.

In step 1303 a UE performs a random access on SCell Y applying a predefined rule according to which the PCell's RA response window value is used as an alternative RA response window value (thereby showing an example of the first, second and third embodiments described above).

In step 1305 a network signals to the UE that SCell Z's RA response window shall be used for SCell Y. In step 1307 the UE performs a random access procedure on SCell Y applying the RA response window value of SCell Z. These steps embrace the fourth embodiment described above.

In step 1309 a UE performs a random access procedure on SCell Y applying a predefined default RA response window value. In step 1311 the network signals to the UE a new default RA response window value. In step 1313 the UE performs a random access procedure on SCell Y applying the network signalled default RA response window value (thereby embracing the fifth embodiment and its sub-embodiments).

Figure 14:
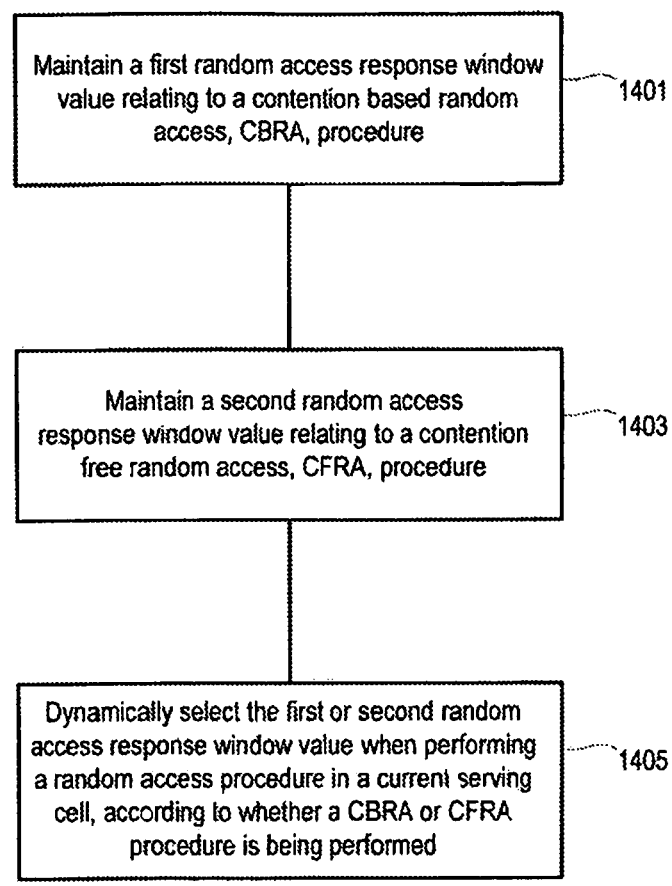
FIG. 14 shows a method in a user equipment node according to another embodiment.

FIG. 14 shows a method in a user equipment node for dynamically selecting a random access response window value for use with random access procedures in a network, according to another embodiment. The method comprises the step of maintaining a first random access response window value relating to a contention based random access, CBRA, procedure, step 1401. A second, random access response window value is maintained, relating to a contention free random access, CFRA, procedure, step 1403. The first or second random access response window value is dynamically selected when performing a random access procedure in a current serving cell, according to whether a CBRA or CFRA procedure is being performed, step 1405.

By maintaining both CBRA and CFRA based RA response window values, this has the advantage that the preferred value can be used on different cells for different reasons. For example, CFRA performed when the current cell is a SCell, and CBRA when the current cell is a PCell.

The method of FIG. 14 may further comprise the steps of: receiving a random access response window value from the network for use with the current serving cell; determining whether the random access response window value received from the network is directed specifically to a CBRA or CFRA response window value; and if so, using the received random access response window value for maintaining a respective CBRA or CFRA response window value; and if not, using the received random access response window value for maintaining both the CBRA and CFRA response window values.

This embodiment uses a default RA value received from the network, when the network does not distinguish between CFRA and CBRA.

The method may further comprise the steps of: receiving a random access response window value from the network for use with the current serving cell; determining whether the random access response window value received from the network node is directed specifically to a CBRA (or CFRA) response window value, and, if so using the received random access response window value for maintaining a respective CBRA (or CFRA) response window value; and determining whether the user equipment has already been signalled a CFRA (or CBRA) response window value, and, if not, using the received CBRA (or CFRA) value as a temporary random access response window value for a CFRA (or CBRA) procedure.

This has the advantage of enabling the network to signal both CBRA and CFRA when necessary, and at other times only signal one or the other. This embodiment provides a workable solution when the network is not configured to provide separate response windows for CFRA and CBRA.

According to one example, upon subsequently receiving a CFRA (or CBRA) response window value from the network, the temporary CFRA (or CBRA) response window value is replaced with the received CFRA (or CBRA) value.

This embodiment uses the CFRA value for CBRA too, or vice versa, when it is signalled a response window value which is directed to only CFRA (or CBRA), or vice versa. This embodiment provides a workable solution when the network is not configured to provide separate response windows for CFRA and CBRA.

The step of determining if a random access response window value received from the network node is directed specifically to a CBRA (or CFRA) response window value may further comprise the step of monitoring an optionality-flag received from the network.

According to one embodiment, the optionality flag is received in a radio resource control, RRC, message.

Figure 15:
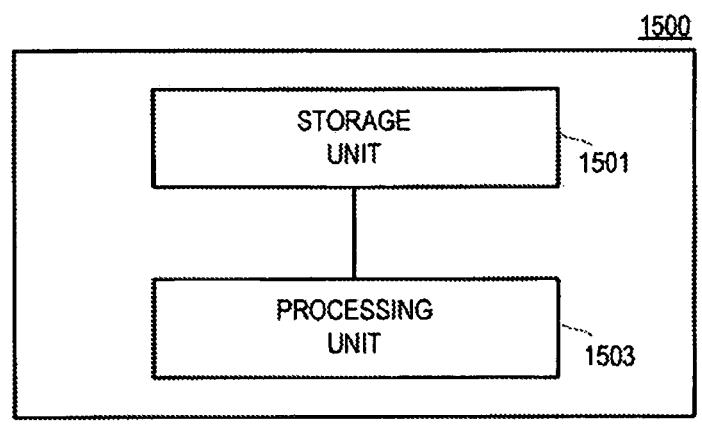
FIG. 15 shows a user equipment node according to another embodiment.

FIG. 15 shows a user equipment node 1500 for dynamically selecting a random access response window value for use with random access procedures in a network, according to another embodiment. The user equipment node comprises a storage unit 1501 adapted to store a first random access response window value relating to a contention based random access, CBRA, procedure, and a second random access response window value relating to a contention free random access, CFRA, procedure. A processing unit 1503 is adapted to dynamically select the first or second random access response window value when performing a random access procedure in a current serving cell, according to whether a CBRA or CFRA procedure is being performed (as shown in step 1405 of FIG. 14).

According to one embodiment, the user equipment node further comprises a receiving unit adapted to receive a random access response window value from the network for use with the current serving cell, with the processing unit 1503 being further adapted to determine whether the random access response window value received from the network is directed specifically to a CBRA (or CFRA) response window value. If so, the received random access response window value is used for maintaining a respective CBRA (or CFRA) response window value. If not, the received random access response window value is used for maintaining both the CBRA and CFRA response window values.

According to one example, the user equipment node 1500 further comprises a receiving unit adapted to receive a random access response window value from the network for use with the current serving cell, with the processing unit 1503 being further adapted to determine whether the random access response window value received from the network node is directed specifically to a CBRA (or CFRA) response window value, and, if so use the received random access response window value for maintaining a respective CBRA (or CFRA) response window value; and determine whether the user equipment has already been signalled a CFRA (or CBRA) response window value, and, if not, use the received CBRA (or CFRA) value as a temporary random access response window value for a CFRA (or CBRA) procedure.

The processing unit 1503 can be further adapted; upon subsequently receiving a CFRA (or CBRA) response window value from the network, to replace the temporary CFRA (or CBRA) response window value with the received CFRA (or CBRA) value.

The processing unit, when determining if a random access response window value received from the network node is directed specifically to a CBRA (or CFRA) response window value, may be further adapted to monitor an optionality-flag received from the network.

According to one example, the processing unit is adapted to monitor a radio resource control, RRC, message for the optionality-flag.

Figure 16:
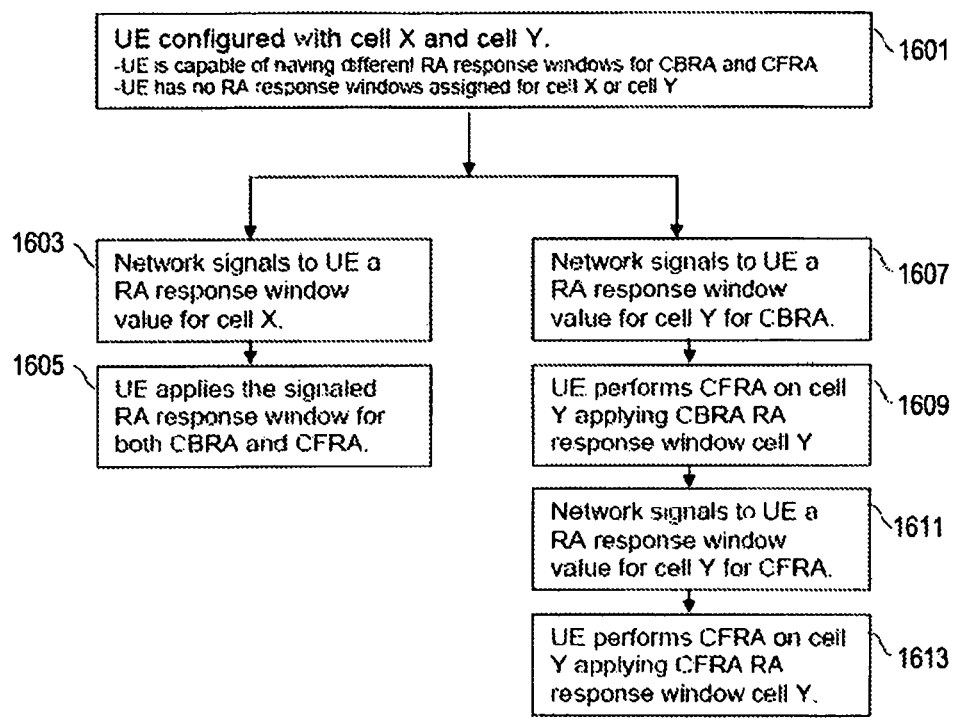
FIG. 16 shows a method in a user equipment node according to another embodiment.

FIG. 16 shows the steps performed in a UE according to the second aspect described above, relating to the sixth to eight embodiments. In step 1601 a UE is configured with cell X and cell Y. In the example, the UE is capable of having different response window values for CBRA and CFRA, and the UE has no RA response window values assigned for cell X or cell Y.

In step 1603 a network signals to the UE a RA response window value for cell X. In step 1605 the UE applies the signalled RA response window for both CBRA and CFRA. These steps embrace the seventh embodiment described above.

In step 1607 the network signals to the UE a RA response window value for cell Y for CBRA. In step 1609 the UE performs CFRA on cell Y applying the CBRA RA response window value of cell Y.

In step 1611 the network signals to the UE a RA response window value for cell Y for CFRA. In step 1613 the UE performs the CFRA on cell Y applying the CFRA RA response window value for cell Y. Steps 1607 and 1609 embrace the eighth embodiment described above, and steps 1611 and 1613 the sixth embodiment.

It is noted that one or more of the method steps of FIG. 16 may be combined with one or more of the method steps of FIG. 13.

Figure 17:
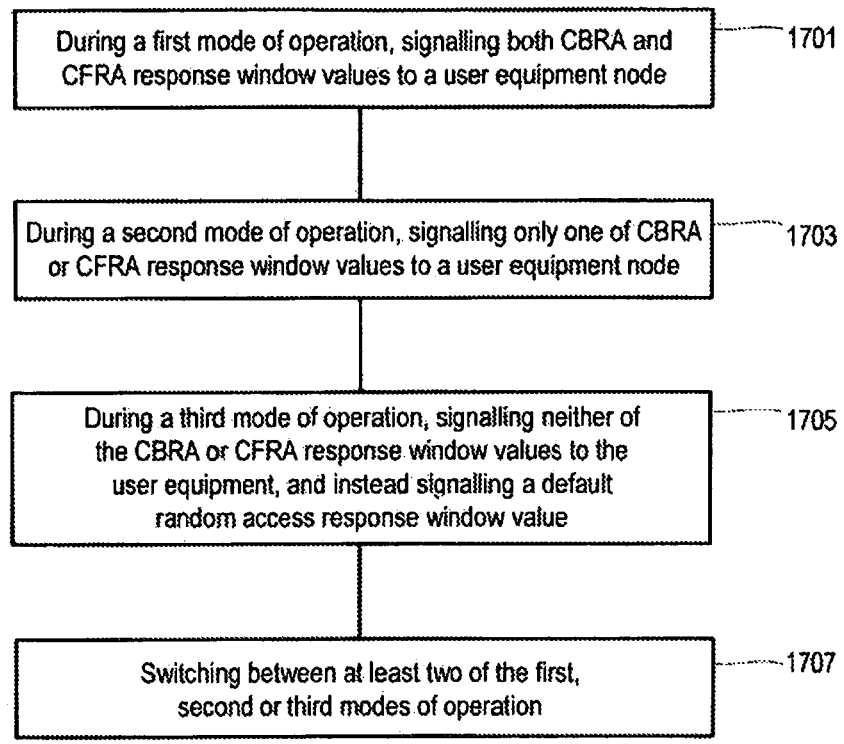
FIG. 17 shows a method in a network node according to another embodiment.

FIG. 17 shows a method in a network node for controlling how a user equipment node dynamically selects a random access response window value for use with random access procedures in the network, according to another embodiment. The method comprises the steps of: during a first mode of operation, signalling both CBRA and CFRA response window values to a user equipment node, step 1701; during a second mode of operation, signalling only one of CBRA or CFRA response window values to a user equipment node, step 1703; and during a third mode of operation, signalling neither of the CBRA or CFRA response window values to the user equipment, and instead signalling a default random access response window value, step 1705; wherein the method comprises the steps of switching between at least two of the first, second or third modes of operation, step 1707.

Figure 18:
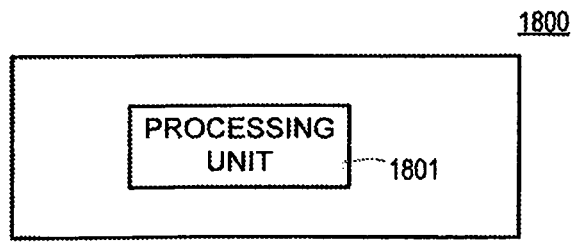
FIG. 18 shows a network node according to another embodiment.

FIG. 18 shows a network node 1800 for controlling how a user equipment node dynamically selects a random access response window value for use with random access procedures in the network. The network node 1800 comprises a processing unit 1801 adapted such that: during a first mode of operation, both CBRA and CFRA response window values are signalled to a user equipment node; during a second mode of operation, only one of CBRA or CFRA response window values are signalled to a user equipment node; and during a third mode of operation, neither of the CBRA or CFRA response window values are signalled to the user equipment, and instead a default random access response window value is signalled; wherein the processing unit is further adapted to switch between at least two of the first, second or third modes of operation.

It is noted that the first cell, and second cell in the embodiments above have been referred to as "serving" cells of LTE. It is noted, however, that in a non-LTE application, the first and second serving cells may be considered as simply "cells".

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a user equipment node for dynamically selecting a random access response window value for use with random access procedures in a network, the method comprising the steps of:

determining if a random access response window value is being signalled from the network for a first serving cell currently associated with the user equipment node; and if so, using the random access response window value being signalled for the first serving cell, when performing a random access procedure in the first serving cell; and if not, using an alternative random access response window value for the first serving cell, when performing a random access procedure in the first serving cell.

2. A method as claimed in claim 1, wherein the alternative random access response window value is a random access response window value associated with a second serving cell.

3. A method as claimed in claim 2, further comprising the step of using predefined rules for selecting the second serving cell whose random access response window value is to be used.

4. A method as claimed in claim 3, wherein the first serving cell is a secondary cell, and wherein the step of selecting the second serving cell according to predefined rules comprises the steps of selecting one or more of the following cells in a particular order:
a primary cell associated with the user equipment node;
another secondary cell having the lowest or highest cell index;
another secondary cell having the lowest or highest secondary cell index;
a serving cell within the same timing advance group which has the lowest or highest cell index;
a serving cell within the same timing advance group which has the lowest or highest secondary cell index;
a serving cell with the lowest or highest carrier frequency;
a serving cell within the same timing advance group which has the highest or lowest carrier frequency.

5. A method as claimed in claim 2, further comprising the steps of:
receiving a control signal from the network; and
using the control signal to select the second serving cell whose random access response window value is to be used as the alternative random access response window value.

6. A method as claimed in claim 5, wherein the control signal received from the network is generic to the first serving cell and its associated second serving cell, and any other first serving cell that does not have a random access response window value assigned thereto.

7. A method as claimed in claim 5, wherein the control signal received from the network is specific to the first serving cell.

8. A method as claimed in claim 1, wherein the alternative random access response window value is a default random access response window value.

9. A method as claimed in claim 8, wherein the default value of the alternative random access response window value is selected from one of the following:
a predefined random access response window value stored in the user equipment;
a default random access response window value signalled to the user equipment from the network; or
a combination of a predefined and network signalled default random access response window value.

10. A method as claimed in claim 9, wherein the step of using a combination of predefined and network signalled default value comprises the steps of:
using the predefined random access response window value stored in the user equipment node, unless the user equipment node receives an overriding random access response window value signalled from the network.

11. A method as claimed in claim 1, wherein the step of determining if a random access response window value is being signalled from the network comprises the step of monitoring an optionality-flag received from the network.

12. A method as claimed in claim 11, wherein the optionality flag is received in a radio resource control, RRC, message.

13. A user equipment node adapted to dynamically select a random access response window value for use with random access procedures in a network, the user equipment node comprising:
a monitoring unit adapted to determine if a random access response window value is being signalled from the network for a first serving cell currently associated with the user equipment node; and
a processing unit adapted to use the random access response window value, if one is being signalled for the first serving cell, when performing a random access procedure in the first serving cell;
wherein the processing unit is further adapted to use an alternative random access response window value when a random access response window value is not being signalled for the first serving cell, when performing a random access procedure in the first serving cell.

14. A user equipment node as claimed in claim 13, wherein the alternative random access response window value is a random access response window value associated with a second serving cell.

15. A user equipment node as claimed in claim 14, wherein the processing unit is further adapted to use predefined rules for selecting the second serving cell whose random access response window value is to be used.

16. A user equipment node as claimed in claim 15, wherein the first serving cell is a secondary cell, and wherein the processing unit is adapted, when selecting the second serving cell according to predefined rules, to select one or more of the following cells in a particular order:
a primary cell associated with the user equipment node;
another secondary cell having the lowest or highest cell index;
another secondary cell having the lowest or highest secondary cell index;
a serving cell within the same timing advance group which has the lowest or highest cell index;
a serving cell within the same timing advance group which has the lowest or highest secondary cell index;
a serving cell with the lowest or highest carrier frequency; or a serving cell within the same timing advance group which has the highest or lowest carrier frequency.

17. A user equipment node as claimed in claim 14, wherein the processing unit is adapted to:
receive a control signal from the network; and
use the control signal to select the second serving cell whose random access response window value is to be used as the alternative random access response window value.

18. A user equipment node as claimed in claim 17, wherein the control signal received from the network is generic to the first serving cell and its associated second serving cell, and any other first serving cell that does not have a random access response window value assigned to it.

19. A user equipment node as claimed in claim 17, wherein the control signal received from the network is specific to the first serving cell.

20. A user equipment node as claimed in claim 13, wherein the alternative random access response window value is a default random access response window value.

21. A user equipment node as claimed in claim 20, wherein the processing unit is adapted to select the default value of the alternative random access response window from one of the following:
 a predefined random access response window value stored in the user equipment;
 a default random access response window value signalled to the user equipment from the network; or
 a combination of a predefined and network signalled default random access response window value.

22. A user equipment node as claimed in claim 21, wherein the processing unit is adapted, when using a combination of predefined and network signalled default values, to use the predefined random access response window value stored in the user equipment node, unless the user equipment node has received an overriding random access response window value signalled from the network.

23. A user equipment node as claimed in claim 13, wherein the monitoring unit, when determining if a random access response window value is being signalled from the network, is adapted to monitor an optionality-flag received from the network.

24. A user equipment node as claimed in claim 23, wherein the monitoring unit is adapted to monitor a radio resource control, RRC, message for the optionality-flag.

25. A method in a network node for controlling how a user equipment node dynamically selects a random access response window value for use with random access procedures in the network, the method comprising the steps of:
 transmitting a control signal to the user equipment node in a first serving cell, wherein the control signal comprises control information for enabling the user equipment node to select a second serving cell whose random access response window value is to be used as an alternative random access response window value, when performing random access procedures in a first serving cell.

26. A method as claimed in claim 25, wherein the transmitted control signal is generic to the first serving cell and its associated second serving cell, and any other first serving cell that requires an alternative random access response window value.

27. A method as claimed in claim 25, wherein the transmitted control signal is specific to a first serving cell.

28. A method as claimed in claim 25, wherein the step of transmitting a control signal further comprises the step of transmitting an optionality-flag, and setting the optionality-flag when transmitting a random access response window for a specific cell.

29. A method as claimed in claim 28, wherein the optionality-flag is transmitted in a radio resource control, RRC, message.

30. A method as claimed in claim 25, wherein the step of transmitting a control signal to a user equipment node comprises the step of selectively sending the control signal, according to whether or not the network node considers that the user equipment node is able to obtain an alternative random access response window.

31. A network node for controlling how a user equipment node dynamically selects a random access response window value for use with random access procedures in a network, the network node comprising:
 a transmitting unit adapted to transmit a control signal to the user equipment node in a first serving cell, wherein the control signal comprises control information for enabling the user equipment node to select a second serving cell whose random access response window value is to be used as an alternative random access response window value, when performing random access procedures in a first serving cell.

32. A network node as claimed in claim 31, wherein the transmitting unit is adapted to transmit a control signal that is generic to the first serving cell and its associated second serving cell, and any other first serving cell that requires an alternative random access response window value.

33. A network node as claimed in claim 32, wherein the transmitting unit is adapted to transmit a control signal that is specific to a first serving cell.

34. A network node as claimed in claim 31, wherein the transmitting unit is further adapted to transmit an optionality-flag, the optionality-flag indicating whether or not a random access response window is being signalled.

35. A network node as claimed in claim 34, wherein the optionality-flag is transmitted in a radio resource control, RRC, message.

36. A network node as claimed in claim 31, wherein the transmitting unit is further adapted to selectively send the control signal, according to whether or not the network node considers that the user equipment node is able to obtain an alternative random access response window.

37. A method in a user equipment node for dynamically selecting a random access response window value for use with random access procedures in a network, the method comprising the steps of:
 maintaining a first random access response window value relating to a contention based random access, CBRA, procedure;
 maintaining a second random access response window value relating to a contention free random access, CFRA, procedure; and
 dynamically selecting the first or second random access response window value when performing a random access procedure in a current serving cell, according to whether a CBRA or CFRA procedure is being performed.

38. A method as claimed in claim 37, further comprising the steps of:
 receiving a random access response window value from the network for use with the current serving cell;
 determining whether the random access response window value received from the network is directed specifically to a CBRA or CFRA response window value; and
 if so, using the received random access response window value for maintaining a respective CBRA or CFRA response window value; and
 if not, using the received random access response window value for maintaining both the CBRA and CFRA response window values.

39. A method as claimed in claim 37, further comprising the steps of:
 receiving a random access response window value from the network for use with the current serving cell;
 determining whether the random access response window value received from the network node is directed specifically to a CBRA or CFRA response window value, and, if so using the received random access response window value for maintaining a respective CBRA or CFRA response window value; and
 determining whether the user equipment has already been signalled a CFRA or CBRA response window value, and, if not, using the received CBRA or CFRA value as a temporary random access response window value for a CFRA or CBRA procedure.

40. A method as claimed in claim 39, further comprising the steps of:
  upon subsequently receiving a CFRA or CBRA response window value from the network, replacing the temporary CFRA or CBRA response window value with the received CFRA or CBRA value.

41. A method as claimed in claim 37, wherein the step of determining if a random access response window value received from the network node is directed specifically to a CBRA or CFRA response window value, further comprises the step of monitoring an optionality-flag received from the network.

42. A method as claimed in claim 41, wherein the optionality flag is received in a radio resource control, RRC, message.

43. A user equipment node for dynamically selecting a random access response window value for use with random access procedures in a network, the user equipment node comprising:
  a storage unit adapted to store a first random access response window value relating to a contention based random access, CBRA, procedure, and a second random access response window value relating to a contention free random access, CFRA, procedure; and
  a processing unit adapted to dynamically select the first or second random access response window value when performing a random access procedure in a current serving cell, according to whether a CBRA or CFRA procedure is being performed.

44. A user equipment node as claimed in claim 43, further comprising:
  a receiving unit adapted to receive a random access response window value from the network for use with the current serving cell; and
  wherein the processing unit is further adapted to determine whether the random access response window value received from the network is directed specifically to a CBRA or CFRA response window value; and
  if so, using the received random access response window value for maintaining a respective CBRA or CFRA response window value; and
  if not, using the received random access response window value for maintaining both the CBRA and CFRA response window values.

45. A user equipment node as claimed in claim 43, further comprising:
  a receiving unit adapted to receive a random access response window value from the network for use with the current serving cell; and
  wherein the processing unit is further adapted to:
    determine whether the random access response window value received from the network node is directed specifically to a CBRA or CFRA response window value, and, if so use the received random access response window value for maintaining a respective CBRA or CFRA response window value; and
    determine whether the user equipment has already been signalled a CFRA or CBRA response window value, and, if not, use the received CBRA or CFRA value as a temporary random access response window value for a CFRA or CBRA procedure.

46. A user equipment node as claimed in claim 45, wherein the processing unit is further adapted, upon subsequently receiving a CFRA or CBRA response window value from the network, replace the temporary CFRA or CBRA response window value with the received CFRA or CBRA value.

47. A user equipment node as claimed in claim 43, wherein the processing unit, when determining if a random access response window value received from the network node is directed specifically to a CBRA or CFRA response window value, is further adapted to monitor an optionality-flag received from the network.

48. A user equipment node as claimed in claim 47, wherein the processing unit is adapted to monitor a radio resource control, RRC, message for the optionality-flag.

49. A method in a network node for controlling how a user equipment node dynamically selects a random access response window value for use with random access procedures in the network, the method comprising the steps of:
  during a first mode of operation, signalling both CBRA and CFRA response window values to a user equipment node;
  during a second mode of operation, signalling only one of CBRA or CFRA response window values to the user equipment node; and
  during a third mode of operation, signalling neither of the CBRA or CFRA response window values to the user equipment, and instead signalling a default random access response window value;
  wherein the method comprises the steps of switching between at least two of the first, second or third modes of operation.

50. A network node for controlling how a user equipment node dynamically selects a random access response window value for use with random access procedures in the network, the network node comprising a processing unit adapted such that:
  during a first mode of operation, both CBRA and CFRA response window values are signalled to a user equipment node;
  during a second mode of operation, only one of CBRA or CFRA response window values are signalled to the user equipment node; and
  during a third mode of operation, neither of the CBRA or CFRA response window values are signalled to the user equipment, and instead a default random access response window value is signalled;
  wherein the processing unit is further adapted to switch between at least two of the first, second or third modes of operation.

* * * * *